United States Patent Office 3,302,740
Patented Feb. 7, 1967

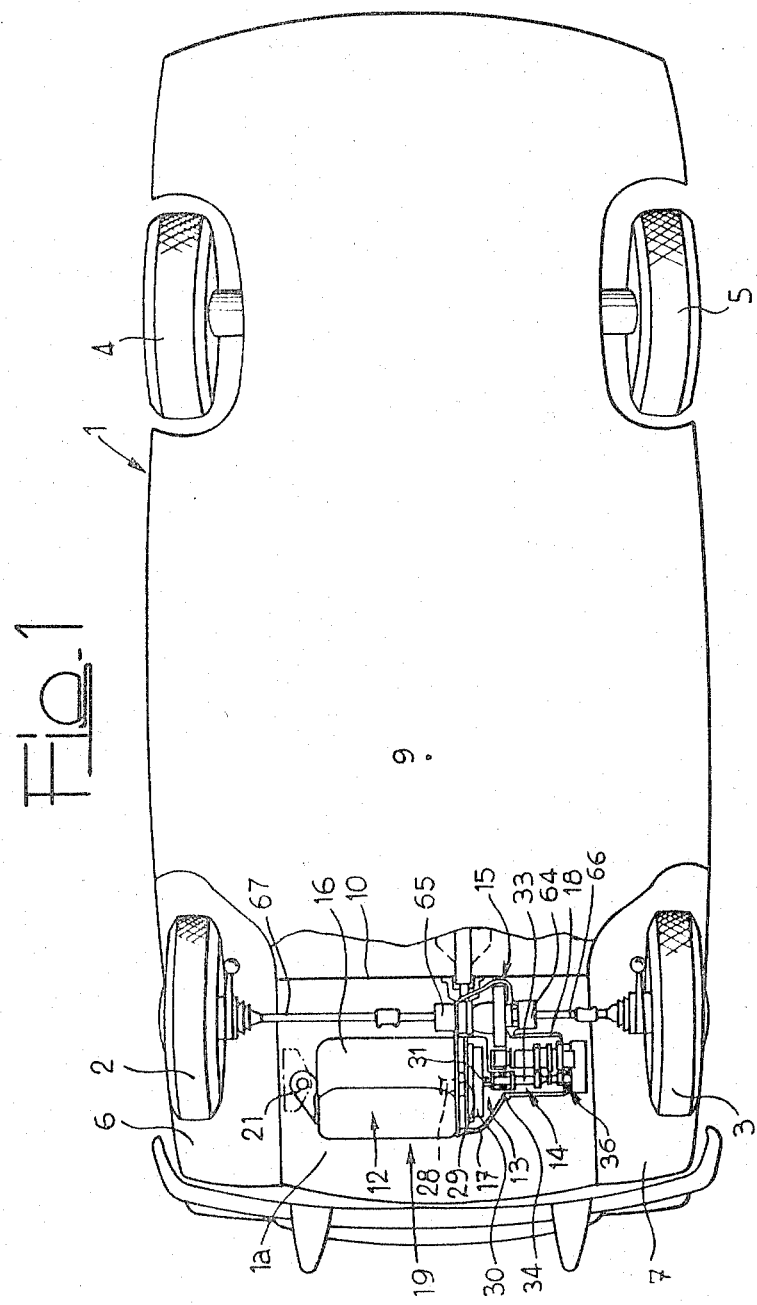

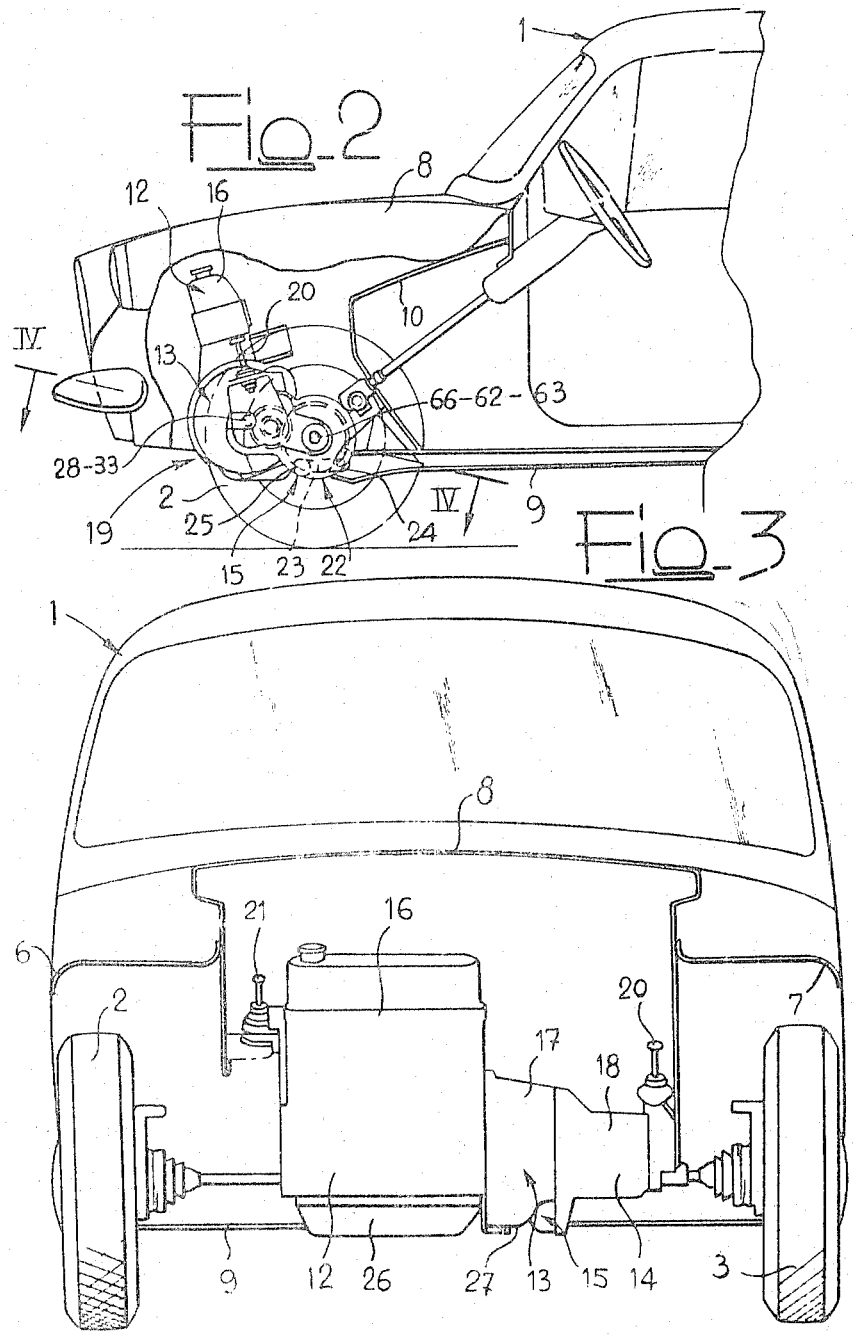

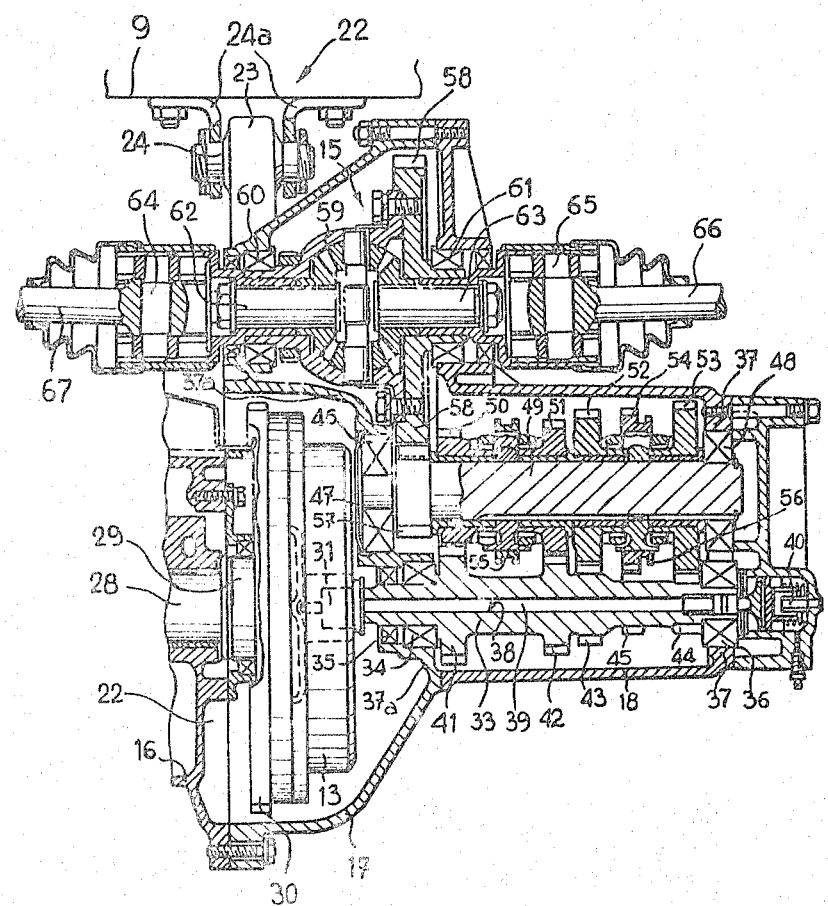

3,302,740
FRONT WHEEL DRIVE AGGREGATE FOR MOTOR VEHICLES
Dante Giacosa, Turin, Italy, assignor to Fiat Società per Azioni, Turin, Italy
Filed Oct. 12, 1964, Ser. No. 403,075
Claims priority, application Italy, Oct. 15, 1963, 21,601/63
2 Claims. (Cl. 180—42)

This invention relates to power transmission units, more particularly for front wheel driven vehicles.

It is known to provide front wheel driven vehicles with a power transmission unit, the component parts of which, such as the engine, friction clutch, gearbox and differential gear are enclosed by a rigid casing arranged in front of the fore wheels, so that the rotational axes of the transmission components of the said parts of the unit are arranged transversely of the motor vehicle.

This invention provides a unit of the abovementioned type wherein the components of the unit are easily accessible without disassembling adjacent parts in the available space between a plane defining the vehicle bottom and the hood of the compartment for the unit, the said space being laterally confined by the mud-guards of the vehicle driven wheels.

The invention further provides in the casing for the unit a plurality of sealed compartments, one compartment acting as the engine crank case, a further compartment housing the friction clutch and a still further compartment housing the gearbox and differential gear; consequently, the engine crank case and the gearbox and differential compartments can be filled with different oils suitable for their special purpose.

With the above and further objects in view this invention provides an engine-power transmission unit, more particularly for front wheel driven vehicles, wherein each of the components of the unit, namely the engine, friction clutch, gearbox and differential gear is enclosed by a rigid casing, said casings being rigidly interconnected to form an integral body situated at the front of the vehicle between the fore wheels, and wherein the rotational axes of the transmission members are transversely arranged with respect to the vehicle, characterized by the fact that the gearbox comprises a primary and a secondary shaft, the former being arranged coaxially with the engine shaft and being adapted to be coupled with the latter through the friction clutch, the secondary shaft having fast therewith a spur pinion meshing with a toothed rim of the differential gear, the said integral body being provided with attachment means to the vehicle.

The invention shall be described with reference to the accompanying drawings which show an embodiment thereof by way of example.

FIGURE 1 is a part sectional plan view of a motor vehicle equipped with an engine-power transmission unit according to this invention;

FIGURES 2 and 3 are a part longitudinal sectional view and a front view, respectively, of the vehicle;

FIGURE 4 is an axial sectional view of the engine-power transmission unit on line IV—IV of FIGURE 2 on an enlarged scale.

Referring to the figures, 1 denotes the vehicle body supported on two fore driven and steering wheels 2, 3 and two idle rear wheels 4, 5. The body 1 comprises two fore mud-guards 6, 7, a hood 8, a bottom 9 and a transverse wall 10 defining a fore compartment on the vehicle.

The compartment, denoted by 1a, houses an engine-power transmission unit comprising an engine 12, a friction clutch 13, a gearbox 14 with a differential gear 15, each being enclosed by its respective rigid casing 16, 17, 18, the casings being rigidly interconnected by flanges to form a integral body 19 fixed to the vehicle body 1 by means of two resilient supports 20, 21 comprising rubber pads and by an oscillating reaction anchorage comprising an arm 23 hinged at one end to the vehicle bottom by means of a pin 24 and by its other end to the body 19 by means of a pin 25.

The supports 20, 21 are arranged in a vertical plane extending transversely of the vehicle, the oscillating anchorage 22 being arranged outside the said plane towards the rear of the vehicle, the axes of the pins 24, 25 extending parallel with the said transverse plane.

The casing 16 housing the engine 12 comprises a bottom extension 26 forming an oil sump for the engine, the differential 15 being housed in the casing 17 formed with an extension 27 communicating with and fixed to the casing 18 enclosing the gearbox 14.

The shaft 28 of the engine 12 extends parallel with the bottom 9 in a plane transversely of the longitudinal vehicle axis, FIG. 4. The end 29 of the shaft 28 extends into the casing 17 for the clutch 13 and has keyed thereto a flywheel 30 acting as a clutch driving member, the outline only of which is visible in the drawing, the flywheel being described in co-pending application Serial Number 403,079 of even date by applicant.

The driven member of the friction clutch 13 is mounted on an end portion 31 of a shaft 33 formed with grooves extending into the clutch casing 17.

The shaft 33 is mounted coaxially with the engine shaft 28 on a bearing 34 provided with a seal member 35 supported in the lateral portion 37a of the casing 17, the other shaft end being mounted on a bearing 36 supported by the lateral portion 37 of the casing 18.

The shaft 33 is formed with an axial bore 38 slidably receiving a control rod 39 for the friction clutch 13. The axial displacements of the rod 39 are effected by a hydraulic cylinder 40 externally secured to the wall 37 of the casing 18. The rod 39 and hydraulic cylinder 40 are described in detail in co-pending application Serial Number 403,079 of even date by applicant.

The shaft 33 has securely fixed thereto or formed thereon spur gears 41, 42, 43, 44, 45 and acts as the primary shaft for the gearbox 14 of cascade type having, as explained hereinafter, its power take-off on the secondary shaft.

A shaft 49 extending parallel with the shaft 33 is mounted in the casing 18 on a bearing 46 provided with a seal cover 47 and a bearing 48, the bearings 46, 48 being supported by the walls 37a, 37, respectively.

The shaft 49 acting as the secondary shaft for the gearbox has freely mounted thereon spur gears 50, 51, 52, 53 meshing with associated gears 41, 42, 43, 44 on the primary shaft 33, and a gear 54 capable of axial displacement, engaging the gear 45 on the primary shaft through an idle gear, not shown.

The idle gears 50 to 54 can each be selectively caused to mesh with the secondary shaft 49 for throwing in any of the four forward and one reverse gears, intermeshing being effected by axially displacing on the shaft 49 the externally operated synchronizers 55, 56 of known types.

The shaft 49 carries a spur pinion 57 securedly fixed thereto, constantly meshing with a toothed rim 58 fast with a case 59 for the differential 15, housed by the extension 27 of the casing 17. The case 59 is mounted for rotation on bearings 60, 61 supported by the casing 17, 27, respectively; so that the rotational axes of the case 59 and of the two outlet shafts 62, 63 of the differential gear 15 and the primary and secondary shafts 33 and 49 of the gear box are parallel and lie in a common plane IV—IV inclined to the car bottom 9 (as shown in FIGURE 2) for most convenient utilization of the space available on the car for arrangement of the engine-power transmission unit and for ascertaining the minimum height of the vehicle bottom above the ground as well as for providing a comfortable space for vehicle occupants, as the space in front of the fore seat is not occupied by the transmission.

The shafts 62, 63 of the differential gear 15 are connected by Cardan joints 64, 65 to the stub axles 66, 67 of their respective fore wheels 2, 3.

While the embodiment of the present invention as herein described constitutes a preferred form, it is to be understood that other forms might be adopted.

What I claim is:

1. A power transmission unit, more particularly for fore wheel driven vehicles having a body comprising; an assemblage of members including an engine, a friction clutch, a gear box and a differential gearing, rotatable shafts in said members cooperating therebetween for transmitting power from the engine to the driven wheels of the vehicle, rigid casings enclosing said members of the unit and interconnected therebetween to form an integral body and arranged at the fore vehicle part between the fore wheels, the axes of said rotatable shafts being arranged transversely of the vehicle, the said gearbox comprising a primary and secondary shaft, the primary shaft being coaxial with the engine crank shaft and connected with the latter by means of said friction clutch, the secondary shaft having fixedly secured thereto a spur pinion meshing with a toothed rim of the differential gear, attachment means being further provided on said integral body for securing it to said vehicle body, and the engine shaft, the primary and secondary shafts of the gearbox and the differential gear shafts arranged with their axes situated in a common plane inclined to a vertical plane containing the longitudinal axis of the vehicle.

2. A power transmission unit, more particularly for fore wheel driven vehicles having a body comprising; an assemblage of members including an engine, a friction clutch, a gear box and a differential gearing, rotatable shafts in said members cooperating therebetween for transmitting power from the engine to the driven wheels of the vehicle, rigid casings enclosing said members of the unit and interconnected therebetween to form an integral body and arranged at the fore vehicle part between the fore wheels, the axes of said rotatable shafts being arranged transversely of the vehicle, the said gear box comprising a primary and secondary shaft, the primary shaft being coaxial with the engine crank shaft and connected with the latter by means of said friction clutch, the secondary shaft having fixedly secured thereto a spur pinion meshing with a toothed rim of the differential gear, attachment means being further provided on said integral body for securing it to said vehicle body, the attachment means including two resilient supports each having a rubber stud arranged externally of the unit in a vertical plane parallel to the axis of the engine crank shaft and an oscillating arm pivoted by means of hinge pins at one end to the lower part of the integral body of the transmission unit and at its other end to the bottom of the vehicle body, the axes of said hinge pins being parallel with the axis of the engine crank shaft and lying externally of the said vertical plane.

References Cited by the Examiner

UNITED STATES PATENTS

| 1,476,173 | 12/1923 | Osborn | 180—42 |
| 2,090,123 | 8/1937 | Hoffman. | |
| 2,782,864 | 2/1957 | Fessia | 180—42 X |

FOREIGN PATENTS

| 249,696 | 2/1964 | Australia. |
| 747,721 | 10/1944 | Germany. |
| 852,706 | 10/1960 | Great Britain. |

A. HARRY LEVY, *Primary Examiner.*